Patented Feb. 26, 1924.

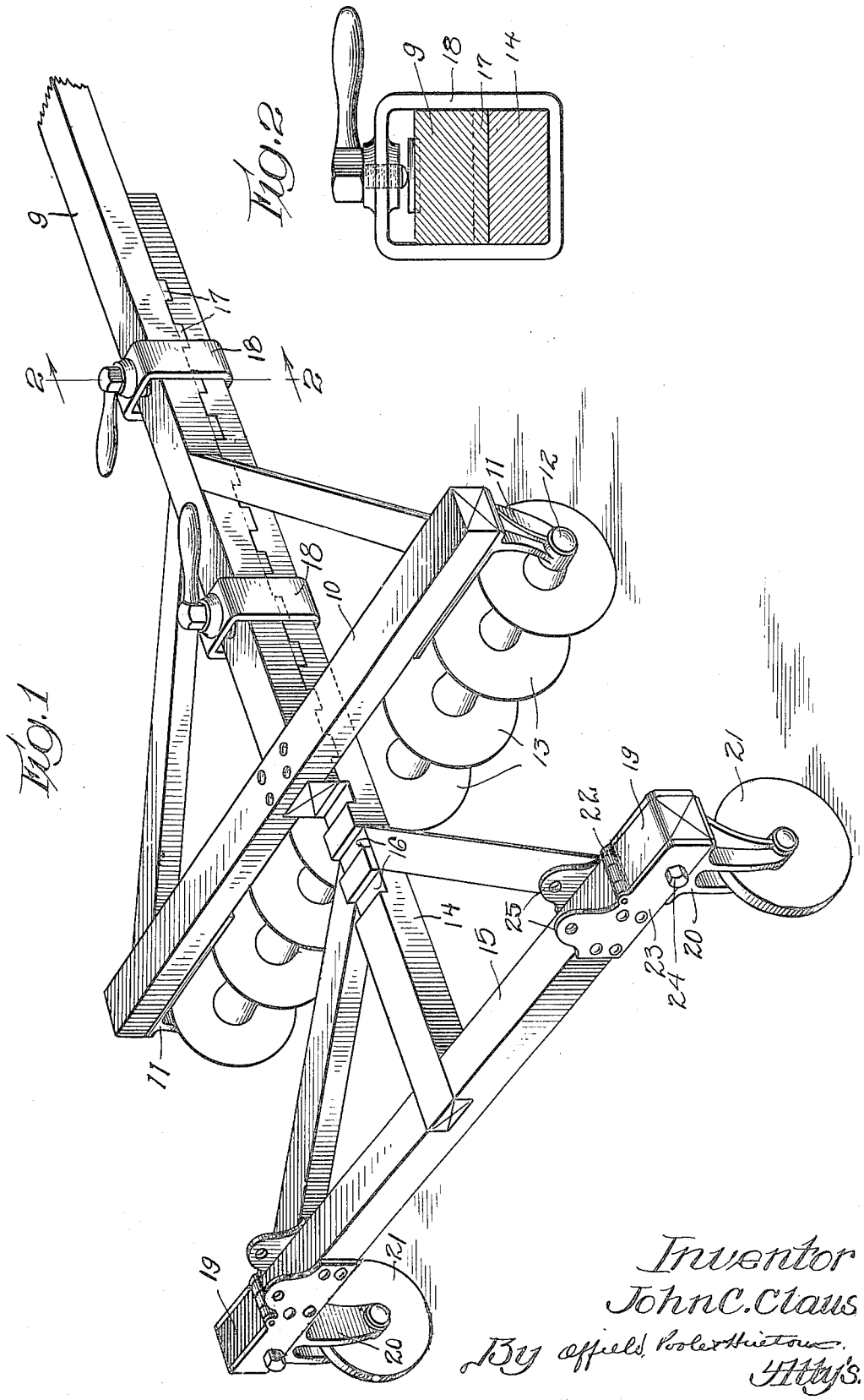

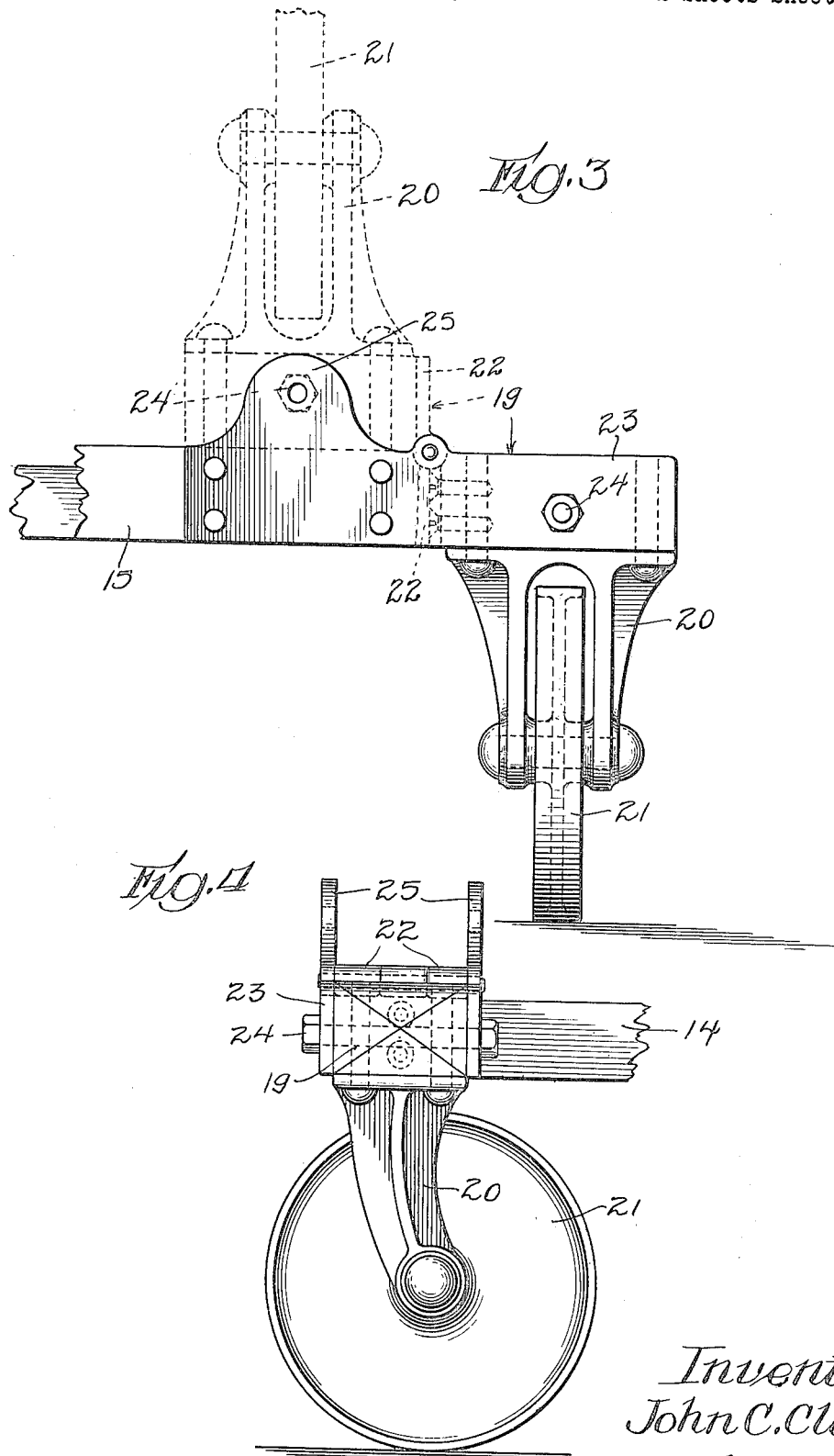

1,484,622

UNITED STATES PATENT OFFICE.

JOHN C. CLAUS, OF ST. LOUIS, MISSOURI, ASSIGNOR TO SIMON JANKOWSKY, OF TULSA, OKLAHOMA.

TRANSPORTING DEVICE FOR DISK CULTIVATORS.

Application filed May 24, 1920. Serial No. 383,710.

*To all whom it may concern:*

Be it known that I, JOHN C. CLAUS, a citizen of the United States, and a resident of St. Louis, in the county of St. Louis and State of Missouri, have invented certain new and useful Improvements in Transporting Devices for Disk Cultivators, of which the following is a specification.

This invention relates to improvements in a transporting device for disk cultivators, and more particularly to devices of the character described adapted for use in transporting the cultivating implement over roads or other surfaces other than that which the implement is designed to work.

The object of the invention is to provide a desirable construction for a transporting device, and one which is simple in construction and easy of operation in rendering the same operative or inoperative when desired.

The preferable construction for a device embodying the features of the invention is hereinafter described and illustrated in the accompanying drawings, wherein—

Figure 1 is a perspective view of a cultivating implement with the transporting device attached thereto, Figure 2 is a detail view in cross section taken on line 2—2 of Figure 1, Figure 3 is a detail view in front elevation showing the manner in which the elevating wheels of the transporting device are moved into non-operative positions, and Figure 4 is a detail view in end elevation showing the elevating wheel in operative position.

The cultivating implement illustrated may be either a disk plow or a disk harrow of any suitable construction, though preferably consisting of a longitudinal beam or tongue 9 provided at its forward end with suitable connecting members by means of which a team of horses or a tractor may be attached. Rigidly connected to the longitudinal beam, or tongue 9, is a cross-beam 10 extending to the desired length on either side of the longitudinal beam 9, there being mounted at the ends of the beam journal hangers 11—11 provided at their lower ends with bearings, preferably of the construction which will exclude the dust therefrom. Extending between the hangers 11—11 and journalled in the bearings thereof, is a shaft 12 on which are mounted a series of disks 13, these disks being of metal and suitably designed to break the surface of the earth and to properly treat it as the implement is drawn over the ground.

Referring now to the transporting device, the same comprises a longitudinal beam 14 and a cross-beam 15 secured to the rear end thereof, and forming a frame not unlike the frame of the cultivating implement to which it is attached. The forward end of the longitudinal beam or tongue 14 passes forwardly between the cross-beam 10 and the disks 13 of the cultivating implement and extends forwardly beyond the cross-beam a suitable distance in contact with the under side of the tongue 9 of the cultivating implement. As a preferable method of connecting the tongue 14 of the transporting device to the tongue 9 of the cultivating implement, there is provided in the under surface of the former a plurality of transverse slots 16 spaced longitudinally throughout a portion of its length.

Secured to the under surface of the tongue 9 are a suitable number of blocks 17 of a size permitting the same to enter the transverse slot 16 of the tongue 14 and likewise extending transversely of the tongue 9, and spaced the same distance apart as are the slots 16. Surrounding the overlapping portions of the tongues 9 and 14 are straps 18 connected together at their ends by suitable screw clamps for tightening or loosening the straps in order to adjust the beam 14 relative to the beam 9 or completely removing the transporting device, if so desired. Manifestly, the purpose of the block and slot connection is to prevent the longitudinal movement of the beam 14 relative to the beam 9.

Referring further to the cross-beam 15 of the transporting device, there are mounted at the ends thereof hinged blocks 19—19 on which are mounted depending hangers 20—20, there being wheels 21—21 journalled at the lower end of the hangers 20, said wheels being of sufficient diameter to effect the elevation of the disks 13 from the ground when the transporting device is attached to the implement and the said wheels are in contact with the surface of the ground. The blocks 19 are hinged to the ends of the cross-beam 15 by means of hinge plates 22 so arranged that the blocks 19—19, together with the hangers 20—20 and the wheels 21—21 may be swung upwardly and inwardly out of contact with the ground and rest upon the upper surface of the cross-beam 15, as shown in Figure 3. In order to lock the blocks 19 in extended position with the wheels 21 in contact with the ground, there are provided plates 23 fixed to either side of the beam 15, said plates projecting beyond the ends of said beam. These plates embrace the block 19 and by the provision of holes in these plates and a registering hole extending through the block 19, a bolt 24 may be inserted through these holes thereby securing the block in place. These plates are further provided with upwardly extending ears 25 adapted to embrace the block when in elevated position and likewise provided with holes which register with the hole in the block 19 so that the same bolt 24 may be used for locking the block in elevated position.

The transporting device herein described is preferably adapted to be attached at all times to the cultivating implement and to be carried thereby during the operation of the same. While the cultivating implement is being transported over the road the elevating wheels 21 are in contact with the ground, thereby raising the disks from the ground and preventing them from becoming worn or damaged. Upon reaching the area to be cultivated, the disks would be lowered to the ground by removing the bolts 24, which lock the blocks 19 in extended position, thereby permitting the latter to be swung upwardly and into non-operative position. Thus, with the transporting device attached to the cultivator, the same would be operated at will until it was again necessary to transport the cultivator upon the roads, and then the wheels 21 would be swung downwardly into ground-engaging position and locked in that position by means of the bolts 24. It is manifest, therefore, that the transporting device would be carried by the cultivator implement at all times and it would not be ordinarily detached.

A transporting device embodying the features of my invention may obviously be modified as to its details of construction without departing from the spirit of the invention, and therefore I do not wish to be limited except in so far as the invention is specifically set forth in the appended claims.

I claim as my invention:

1. The combination with a wheeled implement of a transporting device therefor, comprising a T frame adapted to be secured to the implement with its cross member extending transversely at the rear thereof, wheeled supporting members hinged at the ends of said cross members and having wheels journalled thereon for contact with the ground, said wheel supporting members being adapted to be swung into inoperative position along the top of said cross member and means for locking said wheel supporting members to said cross members in inoperative position.

2. The combination with a wheeled implement of a transporting device therefor, comprising a T frame having a tongue adapted to be secured to the implement and a cross bar extending transversely to the rear thereof, blocks hinged to the ends of said cross member and carrying wheels adapted for contact with the ground, said blocks being swingable over on top of said cross bar, the latter being provided with upstanding flanges adjacent said blocks and a locking member for securing said blocks to said flanges.

3. The combination with a wheeled implement of a transporting device therefor, comprising a T frame having a tongue adapted for detachable and endwise adjustable connection with the implement and a cross bar at the end of said tongue and adapted to trail the implement, wheels mounted at the ends of said cross bar through the medium of hinged blocks adapted to be swung over onto the end portions of said cross bar and upstanding flanges mounted near the ends of said cross bar and adapted to embrace said blocks when swung into inoperative position, said flanges and blocks being provided with registering holes adapted to receive a locking bolt.

4. The combination with a cultivating implement having a tongue, of a transporting device therefor comprising a frame having a longitudinal member adapted for adjustable connection with said tongue, and projecting rearwardly of said implement, a cross-beam at the rear end of said tongue, and wheel supporting hangers hinged to the ends of said cross-beams, elevating wheels journaled in said hangers, said hangers being adapted to be swung upwardly out of contact with the ground, and means for locking said hangers in positions to permit the wheels to engage the ground.

5. The combination with a cultivating implement, of a transporting device therefor comprising a T-shaped frame comprising a longitudinal member adapted for lengthwise adjustable connection with said cultivating implement, and extending rearwardly thereof, and a cross-beam, wheel supporting blocks hinged to the ends of said cross-beams in extended position, elevating wheel hangers depending from said blocks, the latter being adapted to be swung upwardly and over upon said cross-beams, and means for locking said blocks in ground engaging and elevated positions.

In witness whereof, I hereunto subscribe my name this 20' day of March, A. D., 1920.

JOHN C. CLAUS.